United States Patent [19]

Small

[11] 4,133,246
[45] Jan. 9, 1979

[54] HEADLAMP ADJUSTING NUT

[75] Inventor: Robert C. Small, Charlotte, Mich.

[73] Assignee: General Motors Corporation, Detroit, Mich.

[21] Appl. No.: 804,893

[22] Filed: Jun. 9, 1977

[51] Int. Cl.² ............................................. F16B 13/04
[52] U.S. Cl. ...................................... 85/80; 151/41.75
[58] Field of Search ................................ 85/80, 81, 83; 151/41.75; 24/73 P, 73 PF, 73 PM

[56] References Cited

U.S. PATENT DOCUMENTS

| | | | |
|---|---|---|---|
| 2,424,757 | 7/1947 | Klumpp | 85/80 |
| 2,836,215 | 5/1958 | Rapata | 85/80 |
| 3,139,251 | 6/1964 | Walsh | 85/80 |
| 3,143,916 | 8/1964 | Rice | 151/41.75 |
| 3,508,593 | 4/1970 | Gill | 151/41.75 |
| 3,988,808 | 11/1976 | Poe et al. | 24/73 P |

FOREIGN PATENT DOCUMENTS

| | | | |
|---|---|---|---|
| 1390653 | 1/1965 | France | 24/73 PF |
| 2255094 | 4/1973 | Fed. Rep. of Germany | 85/80 |
| 946635 | 1/1964 | United Kingdom | 151/41.75 |

Primary Examiner—Marion Parsons, Jr.
Attorney, Agent, or Firm—Edward J. Biskup

[57] ABSTRACT

A screw and nut assembly for adjustably positioning a headlamp unit relative to a support plate so as to realize proper optical aim for the headlamp unit. The assembly includes a one-piece plastic nut member having a shank insertable into a mounting hole formed in the support plate. The shank has one end formed with a base section and has the other end provided with a pair of spring arms which extend rearwardly along diverging axes towards the base section. The free end of each spring arm terminates with a plurality of teeth so that after the shank is inserted into the mounting hole in the support plate the spring arms move laterally outwardly to cause the teeth on each arm to engage the outer surface of the support plate and thereby hold the nut member in place.

3 Claims, 6 Drawing Figures

HEADLAMP ADJUSTING NUT

This invention concerns adjusting devices for headlamps and more particularly a screw and nut assembly for adjustably positioning a headlamp unit relative to a headlamp housing.

Headlamp assemblies typically use a pair of adjusting screws and nuts for selectively positioning a headlamp unit about horizontal and vertical axes. In order to obtain proper headlamp aiming, the adjusting screw and nut must meet certain performance capabilities, the most important of which is that the headlamp unit and the headlamp housing maintain a fixed relationship under all motor vehicle operating conditions. In addition, the adjusting screw must be easily and accurately adjustable relative to the nut so that proper optical aim for the headlamp unit can be established within the accepted aiming tolerances in a minimum amount of time.

One form of headlamp adjusting screw and nut assembly presently being used on vehicles comprises a generally rectangular body provided with a slightly tapered head section that forms a shank that is adapted to be pressed through a suitably shaped aperture in a headlamp housing. The head section includes a pair of rearwardly extending arms which move laterally inwardly when the nut is inserted into the accommodating aperture, and the arms cooperate with a pair of outwardly extending tang members which normally extend forwardly towards the arms for maintaining the nut in the support plate. Although this form of nut has been successfully used in various vehicles, it has certain drawbacks, not the least of which is that the spring arms are formed in a manner which prevents the nut to be manually installed in the support plate. In addition, the tang members are intended to provide a "spring" in the system which adds to the difficulty during the installation of the nut in the lamp housing.

The present invention concerns a nut design which is intended to alleviate the drawbacks of the nut described above by allowing the spring arms to readily pass through the opening in the support plate and also to compensate for variations in panel thickness. In addition, the ends of the spring arms are formed with steps or teeth which provide positive engagement with the edge of the aperture and serve to lock the nut to the support plate without having any "spring" in the system.

More specifically, the screw and nut assembly made according to the invention comprises a one-piece nut member made of a plastic material and having a noncircular shank which is axially insertable through a complementary mounting hole formed in a headlamp unit support plate. The shank is integrally formed with a base section that is rectangular in configuration and has a pair of planar surfaces which are adapted to engage the rear portion of the support plate. The other end of the shank is formed with a pair of spring arms, each of which extends rearwardly towards the base section and is biased outwardly relative to the longitudinal center axis of the nut member. The free end of each spring arm terminates with a plurality of teeth which lie in a plane that intersects the aforesaid longitudinal center axis of the nut member at a point located adjacent to the base section. The spring arms are movable laterally inwardly towards the shank when the latter is inserted into the mounting hole formed in the support plate and are adapted to move laterally outwardly to have one of the teeth on each of the spring arms engage the front surface of the support plate when the planar surfaces of the base section contact the rear surface of the support plate. Thus, the teeth on the spring arms together with the planar surfaces on the base section cooperate to positively lock the nut member in the mounting hole formed in the support plate. In addition, an axial bore is formed in the shank and extends through the base section for accommodating an adjusting screw for rotation so as to cause adjustable positioning of the headlamp unit relative to the support plate about an axis extending transversely to the optical axis of the headlamp unit for obtaining proper optical aim thereof.

The objects of the present invention are to provide a screw and nut assembly for adjustably positioning a headlamp unit relative to a support plate so as to realize proper optical aim of the headlamp unit; to provide a new and improved nut member made of a plastic material having spring arms formed with a plurality of teeth which are insertable through an aperture formed in a support plate for locking the nut member thereto without requiring a large amount of mounting force; to provide a nut member for a screw and nut assembly that is molded from a plastic material and has a noncircular shank formed with rearwardly extending spring arms which cooperate with a pair of planar surfaces which lie in a transverse plane for connecting the nut member to a support plate; to provide a new and improved nut member for receiving a headlamp adjusting screw and formed with a shank and integral base section with the shank having a pair of spring arms, each of which terminate with a plurality of teeth located in a plane that intersects the longitudinal center axis of the nut member at a point located adjacent to the base section and serves to compensate for variations in the thickness of support plates; and to provide a new and improved nut member for use in headlamp aiming and mountable in a headlamp support housing and characterized in that the nut member has a generally rectangular base section that consists of top, bottom and side walls with the top and bottom walls being integrally formed with an outwardly extending shank that has an axial bore formed therein for accommodating an adjusting screw and also has a pair of rearwardly diverging spring arms which cooperate with the base section for locking the nut member to a support plate.

Other objects and advantages of the invention will be more apparent from the following detailed description when taken with the drawings in which.

Figure 1:
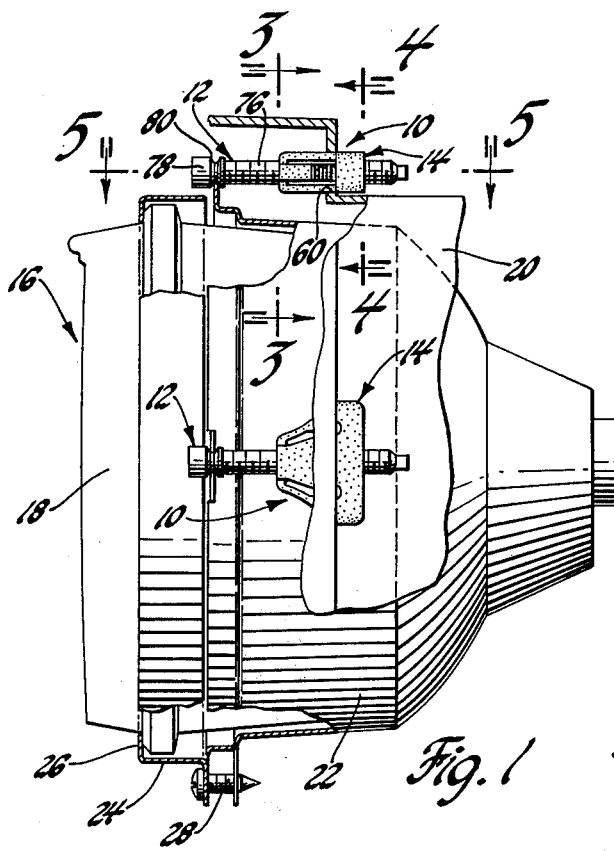
FIG. 1 is a side elevational view showing a headlamp unit mounted within a headlamp support housing and incorporating a pair of screw and nut assemblies made in accordance with the invention for adjustably positioning the headlamp unit.

Referring to the drawings and more particularly FIG. 1, a screw and nut assembly 10 is shown which comprises a screw 12 and nut member 14 shown incorporated with a motor vehicle headlamp assembly 16. As is conventional, two of the screw and nut assemblies 10 are provided at each headlamp assembly 16 for selectively positioning a sealed beam headlamp unit 18 relative to a headlamp housing about horizontal and vertical axes. The headlamp unit 18 is secured to a support member 22 by a retaining ring 24 which has a rim 26 at its forward end engaging the outer periphery of the headlamp unit 18. The inner end of the retaining ring 24 is secured to the support member 22 by fasteners such as the screw 28.

As seen in FIGS. 2–5, the nut member 14 is a one-piece molding formed of a suitable plastic material such as Nylon and comprises a generally rectangular base section 30 that is integral with a forwardly extending shank 32. The base section 30 includes a top wall 34 and a bottom wall 36 which are integrally connected with a pair of laterally spaced side walls 38 and 40. The top and bottom walls 34 and 36 are parallel to each other. Similarly, the side walls 38 and 40 are parallel to each other and together with the top and bottom walls provide a pair of laterally spaced forwardly facing reaction surfaces 41 which lie in a plane that is perpendicular to the longitudinal center axis A of the nut member 14 as viewed in FIG. 5.

Figure 2:
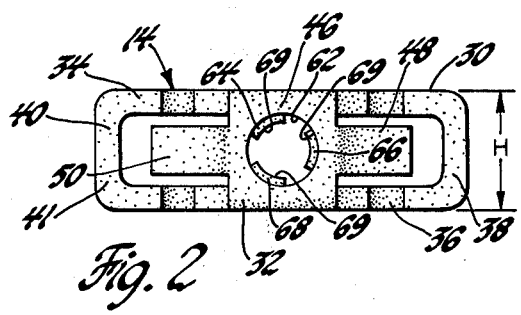
FIG. 2 is an enlarged front view of the nut member incorporated with the screw and nut assembly of FIG. 1.
Figure 5:
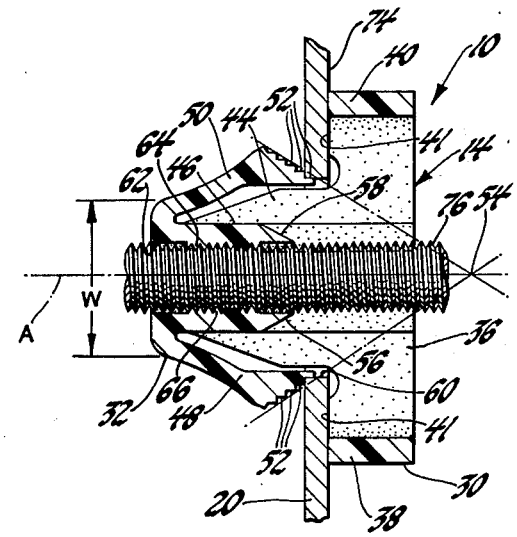
FIG. 5 is an enlarged sectional view of the screw and nut assembly taken on lines 5—5 of FIG. 1.

Both the top wall 34 and bottom wall 36 are integrally formed with forwardly extending planar projections 42 and 44, respectively, between which is a body section 46. The projections 42 and 44 lie in planes that are parallel to each other and together with the body section 46 constitute the shank 32 of the nut member 14. As seen in FIG. 2, the body section 46 is generally square in configuration and has the opposite sides thereof at its forward end formed with a pair of spring arms 48 and 50 which extend rearwardly along diverging axes toward the base section 30. The latter arrangement is best seen in FIG. 5 and it will be noted that each of the spring arms 48 and 50 terminates with a generally triangular section that has a plurality of identical steps or teeth 52 formed thereon which lie in a plane that is perpendicular to the plane of the projection 44 and that intersects the longitudinal center axis A of the nut member 14 at a point 54 located to the rear of and adjacent to the base section 30. The intermediate portion of each spring arm 48 and 50, as seen in FIG. 5, is curved inwardly towards the body section 46 so as to increase the column strength of the spring arm when the nut member 14 is installed in a support plate. The curvature of the intermediate portion of each spring arm also allows easier insertion of the nut member 14 into a support plate as will hereinafter be described.

Figure 3:
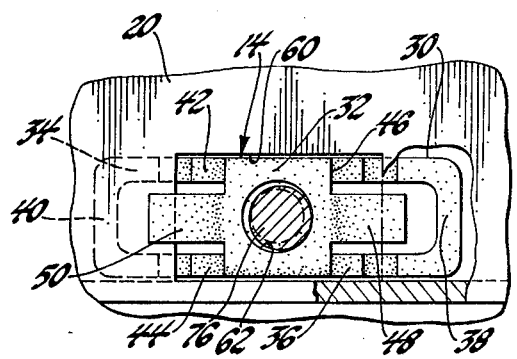
FIG. 3 is an enlarged front view of the screw and nut assembly taken on lines 3—3 of FIG. 1.
Figure 4:
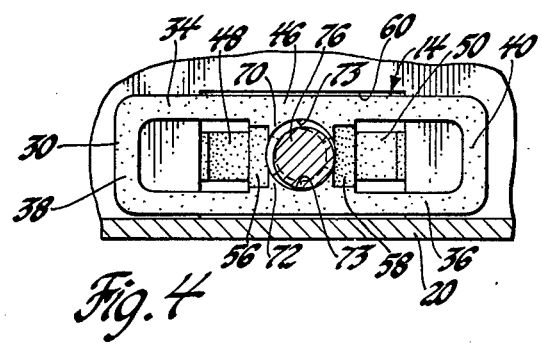
FIG. 4 is an enlarged rear view of the screw and nut assembly taken on lines 4—4 of FIG. 1.

As seen in FIGS. 2–4, each of the spring arms 48 and 50 has a height dimension which is less than the distance between the inner surfaces of the top and bottom walls 34 and 36 of the base section 30. In addition, the rear end of the body section 46 as seen in FIG. 5 is formed with inwardly tapered planar surfaces 56 and 58 which respectively are located in planes that are generally parallel to the planes passing through the teeth 52 formed on the spring arms 48 and 50. This arrangement allows the ends of the spring arms 48 and 50 to move laterally inwardly towards each other so that the triangular section of each spring arm is moved to a position adjacent to the associated inclined surface as shown in phantom lines in FIG. 5. This allows the forward end of the shank 32 to pass through a mounting hole support plate that has the width "W" as shown in FIG. 5 and the height "H" as shown in FIG. 2. It will also be noted that the spring arms 48 and 50 are molded in the positions shown in FIGS. 5 and 6 and if they are moved laterally inwardly towards the body section 46 and then released, the internal elastic forces of the plastic material serves to restore the spring arms to their normal molded positions. In other words, it can be said that the spring arms are normally biased outwardly and can be moved inwardly upon having a force applied thereto such as during insertion of the nut member 14 into a mounting hole 60 located in the support plate portion of the housing 20.

Figure 6:
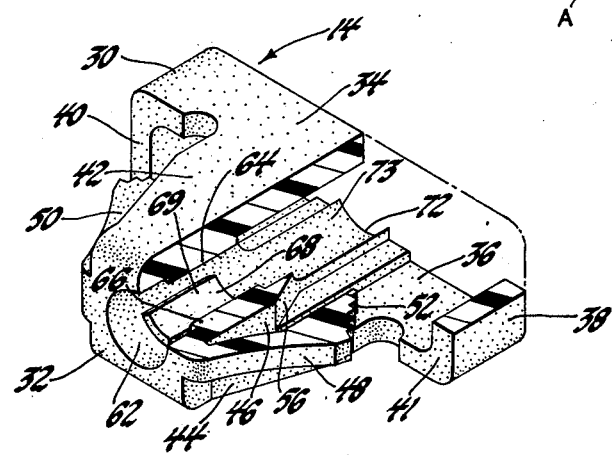
FIG. 6 is a perspective view of the nut member shown in FIGS. 1-5.

The body section 46 of the nut member 14 includes a centrally located bore 62 that has a diameter slightly larger than the major diameter of the thread portion of the screw 12. Within the bore 62 are three identical arcuate and longitudinally extending lands 64, 66 and 68 formed integrally with the inner wall of the bore 62 with the center of each land being circumferentially spaced from the adjacent land by 120°. As seen in FIG. 5, each land 64, 66 and 68 has an axial length which is approximately one-half the length of the bore 62 and is centrally positioned therein. Also, the inner curved surface 69 of each land 64, 66 and 68 lies on a circle having a diameter equal to the minor diameter of the threaded portion of the screw 12. Thus, the forward end of the bore 62 acts as a pilot section, permitting the threaded end of screw 12 to move a distance within the bore 62 prior to having the threads thereof initially cut into the lands 64, 66 and 68 and be threaded towards the base section 30. As seen in FIGS. 4 and 6, the top and bottom walls 34 and 36 are also formed with axially extending ribs 70 and 72 respectively, each of which in this instance has an inner curved surface 73 that lie on a circle having a diameter that corresponds to the diameter of the bore 62. The ribs 70 and 72 serve as guide members for the threaded portion of screw 12 as it continues through the bore 62 and into the base section 30 of the nut member 14.

As seen in FIG. 5, the nut member 14 is assembled to the support plate of the housing 20 by first pressing the shank 32 through the rectangular mounting hole 60. The mounting hole 60 has a height dimension which generally corresponds with the height dimension "H" of the nut member 14, however, the width in this instance is substantially less than the distance between the outer edges of the spring arms 48 and 50 when in the normal position of FIG. 5. As a result, as the shank 32 passes through the mounting hole 60, the spring arms 48 and 50 are forced laterally inwardly until the reaction surface 41 contacts the rear surface 74 of the support plate. In this case, the thickness of the support plate is such that the last tooth of the spring arms 48 and 50 is permitted to engage the inner side edges of the mounting hole 60 when the reaction surface 41 of the base section 30 engages the rear surface of the support plate. As a result, the nut member 14 is locked to the support plate.

The screw 12 utilized with the screw and nut assembly 10 is formed of a suitable metal such as steel and, as seen in FIG. 1, includes a shank portion 76 attached to a head portion 78. The shank portion 76 has the usual helical screw thread formed thereon and the head portion has the usual annular groove 80 for attachment to the support member 22 of the headlamp unit 18 as seen in FIG. 1. To assemble the screw 12 to the nut member 14, the threaded shank portion 76 is first inserted into the pilot section of the bore 62 in the nut member, and the screw 12 is rotated clockwise causing the end thread to bite into the lands 64, 66 and 68 within the body section 46 and form threads therein as shown in FIG. 5. The size of the lands 64, 66 and 68 and plastic material utilized for forming the nut member is such that the threading action gives a locking affect between the threads of the screw 12 and the body section 46 of the nut member 14 when the screw 12 has been threaded into the nut member a distance sufficient to locate the headlamp unit 18 in the adjusted position. As a result, when the screw 12 is positioned within the nut member 14 as shown in FIG. 1, movement of the vehicle or vibrations thereof will not cause any unthreading movement of the screw 12 relative to the nut member 14.

As seen in FIG. 5 and as alluded to hereinbefore, the support plate portion of the housing 20 is of a thickness which causes the last tooth on each of the spring arms 48 and 50 to engage the outer side edge of the mounting hole 60. It will be understood that because of the stepped or toothed configuration of the ends of each spring arm 48 and 50, the thickness of the support plate can vary and still obtain good locking action between the nut member 14 and the support plate. In other words, with a nut member 14 such as shown in FIG. 5, the support plate could have a thickness twice as great as that shown and still allow the nut member 14 to be locked thereto. Also, once the shank 32 passes through the mounting hole 60 and the spring arms 48 and 50 move outwardly to cause one of the teeth thereof to engage the outer edge of the mounting hole as seen in FIG. 5, any axial force applied to the screw 12 is resisted by the spring arms 48 and 50 so that the headlamp unit 18 is positively maintained in the adjusted position.

A nut member 14 such as described above has been successfully incorporated with headlamp units and has the following dimensions:

The length of the top and bottom walls 34 and 36 as seen in FIG. 2 — 31.50 millimeters. The height of the side walls 38 and 40 as seen in FIG. 2 — 10.00 millimeters. The width of the top and bottom walls and the side walls as seen in FIG. 5 — 7.30 millimeters. Wall thickness of top, bottom, and side walls — 2.00 millimeters. The overall length of the nut member 14 as measured along its longitudinal center axis — 22.30 millimeters. The thickness of that portion of the spring arms 48 and 50 located between the triangular end section and the body section 46 — 1.50 millimeters. The width of the body section 46 as seen in FIG. 3 — 9.00 millimeters. The size of the bore 62 — 5.80 millimeters. The diameter of the circle on which the surfaces 69 lie — 4.00 millimeters. The length of the triangular section of each spring arm 48, 50 as seen in FIG. 2 — 4.30 millimeters. Each step 52 was offset by an amount equal to 0.50 millimeters. The length of each spring arm 48 and 50 measured along an axis parallel to the longitudinal center axis "A" as seen in FIG. 5 — 13.90 millimeters. The distance between the extreme outer edges of the spring arms 48 and 50 when in the normal unassembled position — 22.00 millimeters. Length of the body section 46 as seen in FIG. 5 — 12.30 millimeters.

The nut member 14 having the dimensions set forth above is recommended for use with a support plate having a thickness range of 2.03 to 4.06 millimeters with a mounting hole size having the dimensions 10.41 × 15.49 millimeters. The screw used with this nut member can be identified as 12-2B-UNF-2A.

Various changes and modifications can be made in this construction without departing from the spirit of the invention. Such changes and modifications are contemplated by the inventor and he does not wish to be limited except by the scope of the appended claims.

I claim:

1. A screw and nut assembly for adjustably positioning a headlamp unit relative to a support plate so as to realize proper optical aim for the headlamp unit, comprising a one-piece nut member made of a plastic material, said nut member having a shank axially insertable through a complementary mounting hole formed in said support plate, said shank including a body section having a front end and a rear end, said front end of the body section being generally rectangular in shape and the rear end being formed with a pair of planar surfaces inclined towards the longitudinal center axis of the nut member, a base section including top and bottom walls and a pair of laterally spaced side walls integrally formed with one end of said shank and adapted to engage one surface of said support plate, a pair of spring arms formed with the other end of said shank, said spring arms extending rearwardly along diverging axes towards said base section and being biased outwardly relative to the longitudinal center axis of said nut member, the intermediate portion of each spring arm being curved inwardly towards said longitudinal center axis and the free end of each spring arm terminating with a plurality of teeth which lie in a plane that intersects said longitudinal center axis at a point located adjacent to said base section, said spring arms being movable laterally inwardly towards said planar surfaces of the body section when the shank is inserted into said mounting hole formed in the support plate and being adapted to move laterally outwardly to have one of said teeth on each of said spring arms engage the other surface of said support plate when the base section contacts said one surface of said support plate, an adjusting screw rotatably secured to said headlamp unit, and an axial bore formed in said shank and extending through said base section between said top and bottom walls and said spaced side walls for accommodating said adjusting screw whereby rotation of the latter causes adjustable positioning of the headlamp unit relative to the support plate about an axis extending transversely to the optical axis of the headlamp unit.

2. A screw and nut assembly for adjustably positioning a headlamp unit relative to a support plate located in a vertical plane so as to realize proper optical aim for the headlamp unit, comprising a one-piece nut member made of a plastic material, said nut member having a shank axially insertable through a complementary mounting hole formed in said support plate, said shank including a body section having a front end and a rear end, said front end of the body section being generally rectangular in configuration and the rear end being formed with a pair of planar surfaces inclined towards the longitudinal center axis of the nut member, a base section formed with one end of said shank and having a pair of laterally spaced reaction surfaces located in a transverse plane and adapted to engage one surface of said support plate, a pair of spring arms formed with the other end of said shank, said spring arms extending rearwardly along diverging axes towards said base section and being biased outwardly relative to the longitudinal center axis of said nut member, the intermediate portion of each spring arm being curved inwardly towards said longitudinal center axis and the free end of each spring arm terminating with a plurality of teeth which lie in a plane that intersects said longitudinal center axis at a point located adjacent to said base section, said spring arms being movable laterally inwardly towards said planar surfaces of the body section when the shank is inserted into said complementary mounting hole formed in the support plate and being adapted to move laterally outwardly to have one of said teeth on each of said spring arms engage the other surface of said support plate when said pair of reaction surfaces contact said one surface of said support plate, an adjusting screw rotatably secured to said headlamp unit, and an axial bore formed in said shank and extending through said base section for accommodating said adjusting screw whereby rotation of the latter causes adjustable positioning of the headlamp unit relative to the support plate about an axis extending transversely to the optical axis of the headlamp unit.

3. A screw and nut assembly for adjustably positioning a headlamp unit relative to a support plate located in a vertical plane so as to realize proper optical aim for the headlamp unit, comprising a one-piece nut member made of a plastic material, said nut member having a shank that is rectangular in cross section and axially insertable through a complementary mounting hole formed in said support plate, said shank including a body section having a front end and a rear end, said front end of the body section being generally square in configuration and the rear end being formed with a pair of planar surfaces inclined towards the longitudinal center axis of the nut member, a base section having a top wall, a bottom wall and a pair of laterally spaced side walls formed at one end of said shank, said top, bottom, and side walls having a reaction surface located in a plane normal to the longitudinal center axis of the nut member that is adapted to engage one surface of said support plate, a pair of spring arms formed with the other end of said shank, said spring arms extending rearwardly along diverging axes towards said base section and being biased outwardly relative to the longitudinal center axis of said nut member, the intermediate portion of each spring arm being curved inwardly towards said longitudinal axis and the free end of each spring arm being triangular in shape and terminating with a plurality of teeth which lie in a plane that intersects said longitudinal center axis at a point located adjacent to said base section, said spring arms being movable laterally inwardly towards said planar surfaces of the body section when the shank is inserted into said complementary mounting hole formed in the support plate and being adapted to move laterally outwardly to have one of said teeth one each of said spring arms engage the other surface of said support plate when the reaction surface contacts said one surface of said support plate, an adjusting screw rotatably secured to said headlamp unit, a pair of guide ribs for said screw formed with the top and bottom walls of said base section, and an axial bore formed in said shank and registering with said guide ribs formed with said top and bottom walls for accommodating said adjusting screw whereby rotation of the latter causes adjustable positioning of the headlamp unit relative to the support plate about an axis extending transversely to the optical axis of the headlamp unit.

* * * * *